Patented Oct. 9, 1934

1,975,783

UNITED STATES PATENT OFFICE 1,975,783

OIL PAINT RESISTANT TO YELLOWING

Chester G. Gauerke, Wilmington, Del., assignor to E. I. du Pont de Nemours & Company, Wilmington, Del., a corporation of Delaware No Drawing. Application May 25, 1932, Serial No. 613,565

8 Claims. (Cl. 134—56)

This invention relates to methods of treating oils to modify their properties and to compositions containing such modified oils and, more particularly, relates to methods of modifying sunflower seed oil to adapt it for use in coating compositions and to compositions containing such modified sunflower seed oil.

In U. S. Patent 1,725,561, dated August 20, 1929, to Booge and Coolidge, "Modification of drying oils", is disclosed a method of treating drying oils generally and linseed oil particularly, which method comprises heating the oil at a moderate temperature in the absence of oxidizing gas, and then blowing the oil with an oxygen-containing gas at a lower temperature than that used for the heat treatment. This treatment gives a modified oil especially adapted for use in white gloss paint and similar light colored paints capable of drying over night to a dust-free film. Paints made from such oils were materially improved in resistance to yellowing when aged in the dark as compared with theretofore known paints, but the non-yellowing properties of paints made from those oils were still open to improvement.

An object of the present invention is to provide an improved process of producing a paint oil from sunflower seed oil. A further object is to provide an oil having properties in general as satisfactory for paint as the modified linseed oil disclosed in the above mentioned patent but with even greater resistance to yellowing when aged in the dark. Other objects of the invention will be apparent from the description given hereinafter.

The above objects are accomplished according to the present invention by heating sunflower seed oil, or a mixture of oils comprising a major portion of sunflower seed oil, at a moderate temperature in the absence of oxidizing gas and then blowing the oil with an oxygen-containing gas at a temperature lower than that used for the heat treatment. It has been found that, quite contrary to expectations, by so treating sunflower seed oil, which in its raw state is not particularly adapted for use as a paint oil, a modified sunflower seed oil is obtained having general properties for use in paint equal to linseed oil, and additionally, having a materially improved resistance to yellowing when aged in the dark over even the modified linseed oil disclosed in the above patent.

The following example is given to illustrate the method of treatment according to the present invention:

EXAMPLE 1

The oil, preferably raw sunflower seed oil from which the mucilaginous materials or so-called "foots" have been removed, is heat treated in a closed container provided with a means of blowing the oil with an inert gas, or merely maintaining a slow stream of an inert gas across the surface of the oil. During the treatment the oil is maintained at a temperature of about 290° C., air being excluded from the container, which is preferably a kettle made of aluminum, or "Monel" metal, or the like, or enamel lined, and the oil blown with an inert gas such as carbon dioxide or nitrogen in order to carry away the volatile products of decomposition. Instead of blowing the oil, a stream of an inert gas may be passed over the surface of the oil, or the oil may be treated at diminished pressures. In the event that a diminished pressure is used, any intake gas which enters the kettle must consist of an inert gas in order to exclude any oxidizing gas. The oil is heat treated until a test sample shows a viscosity of at least 10 poises, preferably 17–20 poises, at 25° C. This treatment usually takes about 23–30 hours, depending to some extent on the temperature employed. When the desired viscosity is reached the heat is cut off and the oil is allowed to cool to 100° C., or lower, out of contact with air.

The oil is then blown with air, or other oxygen-containing gas, at a temperature of about 100° C. for 3–4 hours. The time of blowing may vary considerably, depending on the temperature used and the drying properties required.

The above example is given merely to illustrate a specific method of carrying out the invention. Instead of using 100% raw or refined sunflower seed oil, the sunflower seed oil may be mixed with considerable proportions of other paint oils, such as perilla oil, chia seed oil, sardine oil, soya bean oil, oiticica oil, Chinawood oil, linseed oil, and the like. The heat treatment of the oil in the closed container may be carried out at a moderate temperature, preferably between 250–300° C., while the blowing treatment is carried out at a considerably lower temperature, preferably between 60–105° C.

During the heating of the oil, it is preferable to avoid local overheating since this may result in excessive decomposition or even the formation of charred products which will affect unfavorably the color of the final product. For this reason it is advantageous to blow an inert gas through the oil during the heat treatment, although the treatment can be successfully carried out by merely maintaining a slow stream of an inert gas across the surface of the oil, or carrying out the treatment under diminished pressure. It is desirable to reduce to a minimum the area of metallic surface which is above the liquid surface of the oil in the kettle, since the thin film of oil on the exposed surface is subject to decomposition and even charring. It is expedient to carry out the treatment with the kettle filled almost to capacity.

As heretofore stated, the modified sunflower seed oil is particularly suited for use in white and light colored coating compositions. The following examples are given to illustrate typical coating compositions employing the modified sunflower seed oil.

EXAMPLE 2

*Mill white gloss paint*

Composition
| | |
|---|---|
| Lithopone | 117 parts |
| Zinc oxide | 29 parts |
| Processed sunflower seed oil | 66.8 parts |
| Mineral spirits | 29 parts |
| Lead as lead resinate (based on oil content) | .14% |
| Cobalt as cobalt linoleate (based on oil content) | .022% |

EXAMPLE 3

*Outside white house paint*

Composition
| | |
|---|---|
| White lead | 104 parts |
| Zinc oxide | 62.9 parts |
| Asbestine | 29.5 parts |
| Processed sunflower seed oil | 87 parts |
| Mineral spirits | 20 parts |
| Lead as lead resinate (based on oil content) | .47% |
| Manganese as manganese resinate (based on oil content) | .018% |
| Cobalt as cobalt linoleate (based on oil content) | .01% |

It will be apparent that the invention is by no means limited to the above coating compositions, inasmuch as the oil is very well suited for general use as a paint oil.

The above pigmented compositions based on the modified sunflower seed oil vehicle are comparable to the corresponding pigmented products based on a linseed oil vehicle prepared according to the disclosure in the above mentioned patent in regard to film properies, flow, gloss, hiding power, and working properties. In regard to after yellowing, however, the pigmented products based on the modified sunflower seed oil are definitely superior to the pigmented products based on a similarly modified linseed oil which is, in turn, definitely superior to pigmented products based on untreated linseed oil. For example, when films of the pigmented products are aged under conditions which accelerate after yellowing, that is, aged in the dark under normal atmospheric conditions, the paints based on the modified sunflower seed oil will still be white as compared with a distinct yellow color of the corresponding paints based on the modified linseed oil, after periods of two, three and four months. At the end of four months' exposure, the modified sunflower seed oil paint proved to be as white as in its original dry condition, so far as could be detected by eye. It is to be understood that any combination of white pigments which are known to the art may be used with the modified sunflower seed oil. Tinted or light colored coating compositions, i. e., those containing as pigment a white pigment tinted by small amounts of colored pigments known to the art so that the films deposited therefrom are light colored, may advantageously use the modified sunflower seed oil to prevent discoloration of the film.

The compositions herein described are suitable for all general uses, but are of particular importance where even the slightest after yellowing is to be avoided.

As many apparently widely different embodiments of this invention may be made without departing from the spirit and scope thereof, it is to be understood that the invention is not limited to the specific embodiments thereof except as defined in the appended claims.

I claim:

1. An oil paint resistant to yellowing comprising a pigment of the class consisting of white and light colored pigments and sunflower seed oil, said oil being modified by heating at a moderate temperature in the absence of oxidizing gas until the viscosity of the oil is at least ten poises and subsequently blowing with an oxygen containing gas at a temperature lower than that used for the heat treatment.

2. An oil paint resistant to yellowing comprising a pigment of the class consisting of white and light colored pigments and sunflower seed oil, said oil being modified by heating at a moderate temperature in the absence of oxidizing gas until the viscosity of the oil is at least ten poises, removing the products of decomposition during the heating and subsequently blowing with an oxlgen containing gas at a temperature lower than that used for the heat treatment.

3. An oil paint resistant to yellowing comprising a pigment of the class consisting of white and light colored pigments and sunflower seed oil, said oil being modified by heating in the absence of oxidizing gas at a temperature not over 300° C. until the viscosity of the oil is at least ten poises and subsequently blowing the oil with an oxygen containing gas at a temperature lower than that used for the heat treatment until the drying rate of the oil is satisfactory for paint purposes.

4. An oil paint resistant to yellowing comprising a pigment of the class consisting of white and light colored pigments and sunflower seed oil, said oil being modified by heating in the absence of oxidizing gas at a temperature not above 300° C. until the viscosity of the oil is at least 10 poises, cooling the oil to a temperature below 105° C. and blowing the oil with an oxygen containing gas at a temperature below 105° C. until the drying rate of the oil is satisfactory for paint purposes.

5. An oil paint resistant to yellowing comprising a pigment of the class consisting of white and light colored pigments and sunflower seed oil, said oil being modified by heating at a temperature between 250 and 300° C. in the absence of oxidizing gas, continuously removing the volatile products of decomposition, continuing the heating until the viscosity of the oil is between 17 and 20 poises, cooling the oil in the absence of an oxidizing gas to a temperature between 60 and 105° C. and blowing the oil with an oxygen containing gas at a temperature between 60 and 105° C. for a period of 3 to 4 hours.

6. An oil paint resistant to yellowing comprising a white pigment and sunflower seed oil, said oil being modified by heating in the absence of oxidizing gas at a temperature not over 300° C. until the viscosity of the oil is at least ten poises and subsequently blowing the oil with an oxygen containing gas at a temperature lower than that used for the heat treatment until the drying rate of the oil is satisfactory for paint purposes.

7. An oil paint resistant to yellowing comprising a white pigment and sunflower seed oil, said oil being modified by heating in the absence of oxidizing gas at a temperature not above 300° C. until the viscosity of the oil is at least 10 poises, cooling the oil to a temperature below 105° C. and blowing the oil with an oxygen containing gas at a temperature below 105° C. until the drying rate of the oil is satisfactory for paint purposes.

8. An oil paint resistant to yellowing comprising a white pigment and sunflower seed oil, said oil being modified by heating at a temperature between 250 and 300° C. in the absence of oxidizing gas, continuously removing the volatile products of decomposition, continuing the heating until the viscosity of the oil is between 17 and 20 poises, cooling the oil in the absence of an oxidizing gas to a temperature between 60 and 105° C. and blowing the oil with an oxygen containing gas at a temperature between 60 and 105° C. for a period of 3 to 4 hours.

CHESTER G. GAUERKE.